Feb. 16, 1954
L. E. RAMPTON
2,669,256
FLUID-METERING VALVE FOR HYDRAULIC MOTOR CONTROL SYSTEMS
Filed Oct. 26, 1951
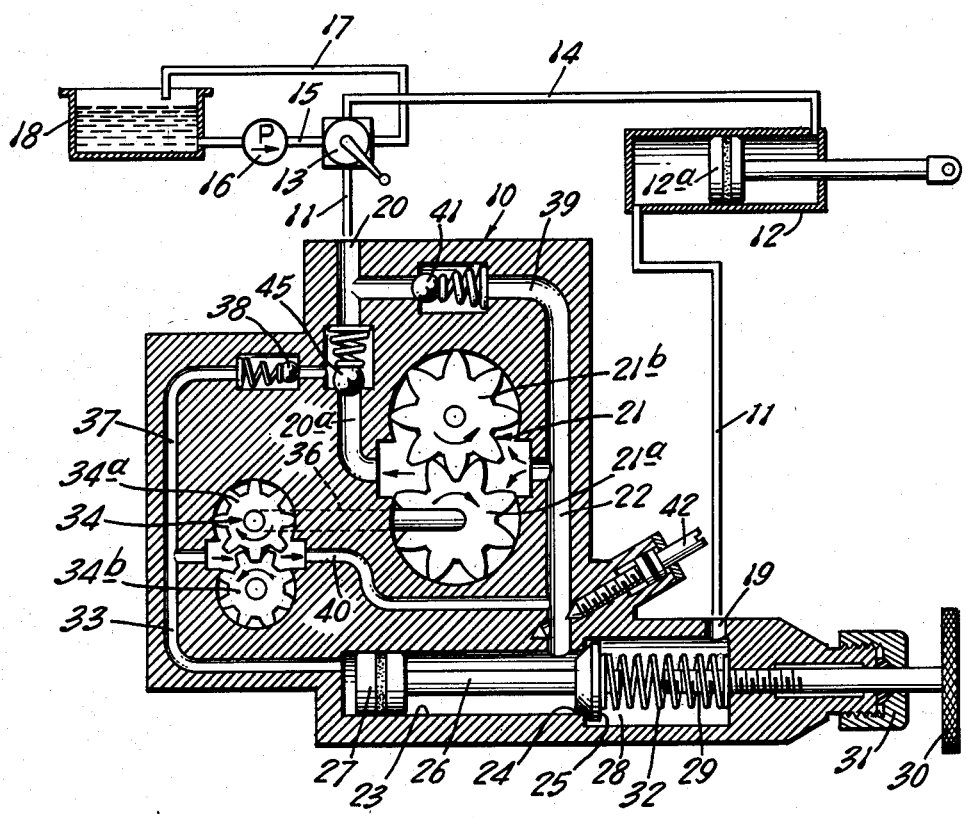
INVENTOR.
L. E. Rampton
BY 
ATTORNEY Patented Feb. 16, 1954

2,669,256

UNITED STATES PATENT OFFICE 2,669,256

FLUID-METERING VALVE FOR HYDRAULIC MOTOR CONTROL SYSTEMS

Lauren E. Rampton, Sun Valley, Calif., assignor to Bendix Aviation Corporation, North Hollywood, Calif., a corporation of Delaware Application October 26, 1951, Serial No. 253,353

9 Claims. (Cl. 137—620)

This invention relates to shut-off valves for hydraulic motors, for automatically stopping such motors when they have been actuated through a predetermined distance, and particularly to valves for such purposes that respond directly to the quantity of fluid flowing through the motor, as distinct from those mechanically actuated by the motor.

The present invention constitutes an improvement in an invention disclosed in Carlos B. Livers and Alvin A. Meddock, U. S. application Serial No. 186,664, filed September 25, 1950, now Patent Number 2,632,470, on a "Fluid Metering Valve for Hydraulic Motor Control Systems."

An object of the invention is to reduce the leakage errors in a shut-off valve of the type disclosed in the aforementioned prior application, and particularly to reduce variations in leakage resulting from changes in the viscosity of the fluid.

Other more specific objects and features of the invention will become apparent from the description to follow.

Briefly, the valve disclosed in the prior application Serial No. 186,664 comprises a reciprocable poppet valve movable between two limits by a small piston, and blocking fluid flow in one limit position. The piston is moved through its stroke at a speed proportional to the rate of fluid flow through the line in which the valve is inserted, but slower in the closing direction of the valve than in the opening direction. This was accomplished by directing the entire flow against the piston during movement in the opening direction, and by limiting the flow from the piston to a definite fraction of the total flow during closing movement of the piston. Limitation of the flow from a fraction of the total flow was obtained by means of a fluid motor connected in the line and mechanically coupled to a smaller pump that metered the fluid displaced by the piston.

In the prior application, the motor and pump were of the gear type. Such devices have appreciable unavoidable leakage because of the impossibility of eliminating all clearance between the moving parts, and the accuracy of metering is impaired by the leakage. The leakage ratio, that is the ratio of the leakage flow to the total flow, is greater in small devices than large devices, because the clearances obtainable in production are essentially the same in large and small devices. The pump being smaller than the motor, the pump introduced more error due to leakage than did the motor. The leakage flow is a function of the pressure drop across the leakage path. In the prior application, the pump was connected in series with the valve-closing piston and in shunt to the motor, so that the pressure drop across the motor, less the pressure drop required to move the piston, was applied to the pump.

In accordance with the present invention, I have discovered that the pressure drop required to move the piston is substantially less than the pressure drop across the motor, so that a major portion of the unavoidable pressure drop across the motor was applied to the pump, and produced excessive leakage therein.

Further in accordance with the invention, I reduce the pressure drop across the pump by connecting the pump directly across the piston instead of in series with the piston and across the motor. This has been found to substantially increase the fluid-metering accuracy of the valve, and to reduce errors resulting from changes in the viscosity (due to changes in temperature) of the fluid. The improved result is somewhat surprising, because, in the prior valve, the line pressure drop functioned to move the valve piston and aid the movement of the pump, thereby reducing the mechanical load on the motor, whereas, in the present invention, the motor must supply the mechanical energy to overcome all the frictional resistance to movement of both the pump and the piston.

A full understanding of the invention may be had from the following detailed description when read in connection with the drawing.

In the drawing, the single figure is a schematic diagram showing an embodiment of the invention.

In the drawing, a valve 10 in accordance with the invention, is shown connected in one of the lines 11 extending between one end of a hydraulic motor cylinder 12 and the usual 4-way control or selector valve 13, which is manually operated to cause the piston 12a of the motor cylinder 12 to move in either direction. The other end of the motor cylinder 12 is connected by a line 14 to the 4-way valve 13, and the latter is connected by a supply line 15 to a pump 16, and by an exhaust line 17 to a reservoir 18. As is well known, the 4-way valve 13 may be moved from a neutral position in which both the lines 11 and 14 are blocked, to maintain the motor piston 12a stationary, into a position in which the pressure line 15 is connected to the line 11, and the exhaust line 17 is connected to the line 14 for moving the piston 12a to the right, or into another position in which the pump line 16 is connected to the line 14, and the exhaust line 17 is connected to the line 11, for moving the motor piston 12a to the left. There are many situations in which it is desirable to automatically limit the stroke of the motor piston 12a. The valve 10 is provided for this purpose, and it functions to block the line 11 during leftward movement of the piston 12a, to stop the latter after a predetermined quantity of fluid has flowed from the left end of the motor cylinder 12 through the line 11 and the valve 10.

The valve 10 has only two external ports, namely, a first port 19 connected to that section of the line 11 leading to the left end of the motor cylinder 12, and a second port 20 connected to that section of the line 11 leading to the control valve 13. The second port 20 is connected by a passage 20a to one side of a gear motor, the other side of which is connected by a passage 22 to a cylinder 23, near the right end thereof. The right end of this cylinder constitutes a valve seat 24 cooperating with a poppet valve 25 that is connected by a rod 26 to a piston 27 movable in the cylinder 23. The cylinder 23 is communicated at its right end, by the valve seat, with a chamber 28 that is at all times connected to the first port 19. An adjustable stop rod 29 for limiting the rightward movement of the poppet 25 is threaded through the wall of the body and provided with a handle 30 on its outer end. A packing gland 31 prevents leakage of fluid past the rod. A helical compression spring 32 may be provided between the end of chamber 28 and the poppet 25 to urge the latter and the piston 27 to the left, but this is not essential.

The left end of the cylinder 23 is communicated by a passage 33 with one side of a gear pump 34, the other side of which is connected by a passage 40 to the passage 22. The gear pump 34 is shown as comprising two gears 34a and 34b, and the gear 34a is coupled by a shaft 36 to one of the gears 21a of the gear motor 21.

The gear pump 34, in addition to having its one side connected to the passage 33, has this same side also connected through a passage 37, containing a check valve 38, with the second port 20, for permitting flow from the port 20 to the left end of the cylinder 23, while preventing reverse flow. Likewise, the gear motor 21 is bypassed by a passage 39 containing a check valve 41, which permits flow past the gear motor from the second port 20 while preventing reverse flow. For a purpose that will be explained in connection with the operation of the device, the check valve 41 is urged into closed position by a spring of appreciable strength so that it functions as a light relief valve to prevent flow from the second port 20, past the gear motor 21, until the pressure in the port 20 has risen to an appreciable value. On the other hand, the valve 38 is provided only as a check valve to prevent reverse flow, and its spring is so light as to be overcome by a very light pressure substantially less than that required to open the valve 41.

The system functions as follows:

The valve is shown in position in which the motor piston 12a has been stopped during leftward movement by closure of the poppet 25 against the seat 24, which blocks the line 11.

When it is desired to move the piston 12a to the right, the 4-way control valve 13 is manipulated to connect the pump output line 15 with the line 11, and connect the exhaust line 17 with the line 14. Pressure fluid thereupon enters the second port 20 of the valve 10, and flows through the passages 37 and 33 and into the left end of the cylinder 23, moving the piston 27 to the right in so doing, and opening the poppet 25 until the latter abuts against the stop rod 29. During this initial phase of the operation, fluid does not flow through the gear pump 34 or through the gear motor 21 because the resistance to movement of those elements is greater than that afforded by the check valve 38 and the piston 27. Likewise, it does not flow through the passage 39 because the resistance of the check valve 41 is sufficient to prevent such flow. However, after movement of the piston 27 has been terminated by contact with the stop 29, the flow of fluid through the passage 37 and the passage 33 is blocked, and the pressure then rises to a value sufficient to open the check valve 41 and permit the fluid to flow through the passage 39, and through the open valve seat 24 into the chamber 28, and through the first port 19 to the left end of the motor cylinder 12, moving the piston 12a therein to the right. This movement continues until either the piston 12a reaches the right end of its stroke, or until the control valve 13 is restored to neutral. In most instances the motion is continued until the piston 12a reaches the right end of its stroke, after which the valve 13 is returned to neutral.

When next the control valve 13 is manipulated to supply pressure fluid to the line 14 and connect the line 11 to exhaust, the fluid flows through the line 14 into the right end of the cylinder 12, moving the piston 12a therein to the left and exhausting fluid through the line 11 into the first port 19 of the valve 10. This fluid flows through the chamber 28 and through the open valve seat 24 and into the passage 22. The fluid is blocked from flowing through the passage 39 by the check valve 41, so that it must flow through the gear motor 21, rotating the latter in so doing. The fluid, after passing through the gear motor, flows through the passage 20a, to the second port 20, and thence back to the control valve 13. If the gear motor 21 had no leakage, it would rotate at a speed proportional to the flow of fluid therethrough, and therefore proportional to the movement of the motor piston 12a, and it would drive the gear pump 34 at a speed proportional to the movement of the piston 12a. If the gear pump 34 had no leakage, it would pump fluid from the left end of the cylinder 23 through the passage 33 and through the passages 40 and 22 back to the right end of the cylinder 23, at a rate proportional to the movement of the motor piston 12a. Still assuming no leakage, when the motor piston 12a has traveled a predetermined distance to the left, the piston 27 will have moved the poppet 25 against the seat 24, positively blocking any further flow of fluid through the line 11, and stopping the motor piston 12a in the position determined by the amount of fluid that is required to move the poppet 25 from its rightmost position against the stop 29 into its leftmost position against the seat 24. This completes a cycle of operation.

During movement of the piston 27 to the left the pressure of the fluid entering the first port 19 is applied through the cylinder 23 to the right end of piston 27, but substantially the same pressure is also applied through the passage 40 to the discharge side of the pump 34, so that this pressure is practically balanced insofar as the pump 34 is concerned, and is not effective to produce a torque thereon in either direction. Hence, the movement of the piston 27 is determined almost entirely by the capacity of the pump 34 to pump fluid from the left end of the cylinder 23 into the right end thereof.

Actually, the gear motor 21 and the gear pump 34 always have a certain amount of leakage, so that the movement of the piston 27 is a function of the total volume of fluid passing through the valve as modified by a slippage factor represented by the leakage. If the leakage were constant it would not be objectionable, because it could be taken into account. But it varies with the viscosity of the fluid. The leakage through the pump 34 is more serious than that through the motor 21 because of the smaller size and volumetric capacity of the former. I have found that connecting the pump 34 directly across the piston 27, instead of in series between the piston and the second port 20, as in the prior application, materially reduces variations in the leakage through pump 34 with variations in viscosity of the fluid. The reason for this is that a reduction in viscosity reduces the frictional resistance to movement of the piston 27 in addition to reducing the resistance to leakage flow through the clearance spaces of the pump.

In the prior system, since the entire pressure drop across the motor 21 was applied to the piston 27 and the pump 34 in series, a reduction in viscosity not only reduced the leakage resistance of the pump but increased the pressure drop across it (because of the reduced pressure drop across the piston); hence the change in leakage resistance and the change in pressure drop across the pump were cumulative, tending to increase the slippage factor with decrease in viscosity of the fluid.

In contrast, the system of the present invention provides a decreased pressure drop across the pump in response to a decrease in viscosity, which is opposite in effect (as to the slippage factor) to that of the decreased leakage resistance of the pump resulting from the same decreased viscosity. The decrease in pressure drop across the pump with decrease in viscosity follows naturally from the fact that the pressure drop across the pump is only that required to move the piston 27, and the frictional resistance of the latter varies directly with the viscosity of the fluid, which constitutes the lubricant between the piston and the cylinder wall.

A check valve 45 is shown between the passage 20a and the second port 20 to positively prevent flow of fluid from the second port 20 through the motor 21. However, ordinarily the resistance to motion of the gear motor is sufficiently great to prevent such flow, and the check valve 45 can be dispensed with.

The gear motor 21 is preferably of much larger capacity than the gear pump 34. Hence, the amount of fluid displaced by the piston 27 can be a very small fraction of the total volume of fluid flowing through the gear motor 21. This makes it possible for the cylinder 23 and the piston 27 to be relatively small and compact. Furthermore, since, when pressure fluid is supplied to the second port 20 to move the motor piston 12a to the right, all of the fluid initially flows past the check valve 38 into the left end of the cylinder 23, this cylinder is filled very rapidly, and the piston 27 is moved through its full stroke into contact with the stop 29 before the motor piston 12a has traveled any appreciable distance. This insures positive resetting of the valve 25 against the stop 29 on each operation. It also permits the operator, if he so desires, to move the motor piston 12a a further distance to the left, by admitting pressure fluid into the second port 20 just long enough to restore the piston 27 into its rightmost position (which operation moves the motor piston 12a hardly at all) and then immediately reversing the valve 13 to again supply pressure fluid to the line 14. The motor piston 12a then moves a further distance to the left, equal to its normal movement from the right end of its stroke, because the movement of the piston 27 will again meter the normal amount of fluid.

Obviously the position in which the piston 12a is normally stopped may be varied between wide limits by adjusting the stop 29.

As has been previously indicated, the spring 32, for urging the piston 27 to the left, is not essential. The pump 34 will produce sufficient pressure drop across the piston 27 to move it. However, the greater the load on pump 34, the greater is the pressure-drop across it, and the greater the leakage. In any event, the stiffness of this spring 32 should be such that it produces insufficient force to overcome the frictional resistance to movement of the piston 27. It then merely aids the movement of the piston 27 to the left, thereby reducing the load on the pump 34a, and reducing the pressure drop thereacross. It is to be remembered that the resistance afforded to flow of fluid from the pump 34 through the passage 40 into the right end of cylinder 23, and from the left end of the cylinder through the passage 33 to the input side of the motor is predominately that due to the frictional resistance to movement of the piston 27. In this connection, it should also be borne in mind that the cross-sectional area of the piston 27 is usually very small, and the pressure required to overcome its frictional resistance to movement is greater than it would be with a larger piston.

It is possible to increase or decrease the compensating effect of the resistance of piston 27 on the leakage of the motor 34 by varying the strength of the spring 32. Thus if the spring force is sufficient to almost balance the frictional resistance to movement of the piston 27 under conditions of minimum fluid viscosity the percentage increase in the pressure drop required to overcome the increased resistance to movement of the piston resulting from a given increase in viscosity will be much greater than if the spring were omitted. Hence, the effect of the spring is to oppose the tendency of the leakage to increase as the viscosity of the fluid decreases. The spring can produce overcompensation if too strong, and in many instances it is desirable to omit it entirely.

It is also possible to alter the relation between pump leakage and viscosity by developing a pressure drop in the passage 22 between the cylinder 23 and the passage 40. Such a pressure drop can be produced by partially obstructing the passage 22 by screwing in a needle valve 42. During operation of the gear motor and pump, the flow of line fluid upward through the passage 22 past the needle valve 42 raises the pressure in the right end of cylinder 23 relative to that in the passage 40, the resultant pressure differential aiding the pump 34 and reducing the pressure drop thereacross. This needle valve, like the spring 32, provides a method of compensating for the frictional load of the piston 27 on the pump 34 to obtain a fine adjustment of the pressure drop across the pump, but in most instances it is not necessary and can be omitted.

It is to be noted that by excessively closing the needle valve 42, a pressure drop can be obtained that will more than overcome the friction of the piston 27, and tend to drive the pump 34 as a motor, thereby producing the undesirable results of increased leakage when the viscosity is reduced.

As has been previously stated, despite the fact that the pump 34 must produce a pressure drop across the piston 27 effective to move it (independently of any pressure drop within the valve 10 between the ports 19 and 20, due to flow of line fluid therethrough), the pressure drop across the pump 34 is less than in the prior application, in which the output of the pump is connected to the port 20 instead of to the right end of the cylinder 23. It has been found by test that the present system is effective in greatly reducing errors due to changes in viscosity of the fluid. In addition, it has also been found that the present device is able to repeat its performance under the same pressure and temperature conditions with greater accuracy.

Although for the purpose of explaining the invention, a particular embodiment thereof has been shown and described, obvious modifications will occur to a person skilled in the art, and I do not desire to be limited to the exact details shown and described.

I claim:

1. A valve of the type described comprising: first and second line ports; a cylinder containing a piston reciprocable therein; a pump; a fluid motor mechanically coupled to said pump for driving it, and first passage means connecting said motor between one end of said cylinder and said second port; valve means connecting said one end of said cylinder to said first port; means mechanically coupling said piston to said valve means for closing said valve means in response to movement of said piston away from said one end of said cylinder into a predetermined limit position, and opening said valve in all other positions; and second passage means connecting said pump between opposite ends of said cylinder; said pump being so sensed with respect to said motor and said cylinder as to pump fluid from the other end to said one end of said cylinder in response to fluid flow from said first port through said valve means and said motor to said second port.

2. A valve according to claim 1 in which said motor has substantially larger volumetric capacity than said pump, and the volumetric capacity of said cylinder is small relative to the total volume of fluid flow through said motor required to actuate said piston through its stroke, said motor and pump having leakage ratios proportional to the pressure drops thereacross and inversely proportional to their volumetric capacities.

3. A valve according to claim 1 in which said pump is a gear pump and said motor is a gear motor.

4. A valve according to claim 1 including third passage means connecting said second port with said other end of said cylinder, and fourth passage means connecting said second port with said one end of said cylinder, and a check valve in each of said third and fourth passage means for preventing flow therethrough from said cylinder to said second port while permitting flow in the opposite direction, the check valve in said third passage opening in response to a lower pressure in said second port than the check valve in said fourth passage, whereby fluid entering said second port first flows through said third passage into said other end of said cylinder to move said piston away from said other end to the limit of travel, and thereafter flows through said fourth passage.

5. A valve of the type described for controlling flow of a fluid of variable viscosity comprising a body having: first and second line ports; a cylinder containing a piston reciprocable therein; first passage means including a pump connected between the opposite ends of said cylinder for controlling fluid flow from said other end to said one end of said cylinder; a fluid motor mechanically coupled to said pump for driving it, and second passage means connecting said motor between said second port and said one end of said cylinder; valve means connecting said one end of said cylinder to said first port; means mechanically coupling said piston to said valve means for closing said valve means in response to movement of said piston into said other end of said cylinder, and opening said valve in all other positions; said motor being so sensed with respect to said pump that fluid flow from said first port through said valve means and said motor to said second port actuate said pump in direction to deliver fluid from said other end of said cylinder to said one end thereof.

6. A valve according to claim 5 in which said pump has clearance spaces therein providing a leakage path for fluid, the resistance of said leakage path increasing with an increase in the viscosity of the fluid, and the cooperating bearing surfaces of said piston and cylinder are lubricated by said fluid, whereby the frictional resistance to movement of the piston increases with an increase in the viscosity of the fluid.

7. A valve according to claim 6 including spring means coupled to said piston for applying thereto a force urging it toward said other end of said cylinder, the magnitude of said force being less than the frictional force resisting movement of said piston.

8. A valve according to claim 6 in which a portion of said first passage means between said pump and said one end of said cylinder is common to a portion of said second passage means between said motor and said one end of said cylinder, whereby the pressure drop of fluid flow from said first line port to said motor through said common portion of said second passage means is applied to said first passage means to urge said piston toward said other end of said cylinder.

9. A valve according to claim 8 including restriction means in said common passage portion for increasing the pressure drop therethrough.

LAUREN E. RAMPTON.

No references cited.